United States Patent
Song

[19]

[11] Patent Number: 5,963,554
[45] Date of Patent: Oct. 5, 1999

[54] ATM SWITCH DEVICE CONSTRUCTED FROM BANYAN NETWORK AND ITS INSTALLATION METHOD

[75] Inventor: Doug-Young Song, Seongnam, Rep. of Korea

[73] Assignee: SamSung Electronics Co., Ltd., Suwon, Rep. of Korea

[21] Appl. No.: 08/774,177

[22] Filed: Dec. 26, 1996

[30] Foreign Application Priority Data

Dec. 26, 1995 [KR] Rep. of Korea ........................ 95-56578
Dec. 26, 1995 [KR] Rep. of Korea ........................ 95-56580

[51] Int. Cl.⁶ ............................. H04L 12/28; H04L 12/56
[52] U.S. Cl. ............................................ 370/395; 370/388
[58] Field of Search .................................... 370/386, 387, 370/388, 389, 395, 398, 399, 419, 422, 351, 359, 360, 411; 340/825.8

[56] References Cited

U.S. PATENT DOCUMENTS

| | | |
|---|---|---|
| 4,912,700 | 3/1990 | Maddern et al. . |
| 5,130,976 | 7/1992 | Hickey et al. . |
| 5,189,666 | 2/1993 | Kagawa . |
| 5,357,506 | 10/1994 | Sugawara . |
| 5,357,510 | 10/1994 | Norizuki et al. . |
| 5,369,400 | 11/1994 | Bowdon ............................. 340/825.8 |
| 5,465,251 | 11/1995 | Judd et al. . |
| 5,491,687 | 2/1996 | Christensen et al. . |
| 5,509,123 | 4/1996 | Dobbins et al. . |
| 5,546,540 | 8/1996 | White . |
| 5,648,957 | 7/1997 | Lee et al. ............................. 370/355 |

*Primary Examiner*—Ajit Patel
*Attorney, Agent, or Firm*—Robert E. Bushnell, Esq.

[57] ABSTRACT

An ATM switch device of the present invention is designed to construct the switch network with a large capacity in which unit switches are modulized in a certain scale and installed in a three-dimensional structure. ATM switch device constructed from Banyan network using unit switches. Unit switches placed at the front part of said switching device are partitioned by the front-end unit switches. Unit switches at the rear part of said switching device are partitioned by the rear-end unit switches. The front-end unit switches with same distance are arranged horizontally. The rear-end unit switches with same distance are arranged vertically. Then, the output ports of said horizontally-arranged front-end unit switches are orthogonally (in order) connected to input ports of vertically-arranged rear-end unit switches at the rear-end.

19 Claims, 19 Drawing Sheets

PCB Patterns

INPUT PORT
NUMBER

| | 4 | 3 | 2 | 1 |
|---|---|---|---|---|
| PCB1 | 12 | 4 | 8 | 0 |
| PCB2 | 14 | 6 | 10 | 2 |
| PCB3 | 13 | 5 | 9 | 1 |
| PCB4 | 15 | 7 | 11 | 3 |

*Fig. 10A*

| PCB- | D | C | B | A |
|---|---|---|---|---|
| 1 | 12 | 8 | 4 | 0 |
| 2 | 13 | 9 | 5 | 1 |
| 3 | 14 | 10 | 6 | 2 |
| 4 | 15 | 11 | 7 | 3 |

OUTPUT PORT
NUMBER

*Fig. 10B*

INPUT PORT NUMBER

← 8 7 6 5 4 3 2 1 →

| | 8 | 7 | 6 | 5 | 4 | 3 | 2 | 1 |
|---|---|---|---|---|---|---|---|---|
| PCB1 | 56 | 24 | 48 | 16 | 40 | 8 | 32 | 0 |
| PCB2 | 60 | 28 | 52 | 20 | 44 | 12 | 36 | 4 |
| PCB3 | 57 | 25 | 49 | 17 | 41 | 9 | 33 | 1 |
| PCB4 | 61 | 29 | 53 | 21 | 45 | 13 | 37 | 5 |
| PCB5 | 58 | 26 | 50 | 18 | 42 | 10 | 34 | 2 |
| PCB6 | 62 | 30 | 54 | 22 | 46 | 14 | 38 | 6 |
| PCB7 | 59 | 27 | 51 | 19 | 43 | 11 | 35 | 3 |
| PCB8 | 63 | 31 | 55 | 23 | 47 | 15 | 39 | 7 |

Fig. 11A

| PCB- | H | G | F | E | D | C | B | A |
|---|---|---|---|---|---|---|---|---|
| 1 | 56 | 48 | 40 | 32 | 24 | 16 | 8 | 0 |
| 2 | 57 | 49 | 41 | 33 | 25 | 17 | 9 | 1 |
| 3 | 58 | 50 | 42 | 34 | 26 | 18 | 10 | 2 |
| 4 | 59 | 51 | 43 | 35 | 27 | 19 | 11 | 3 |
| 5 | 60 | 52 | 44 | 36 | 28 | 20 | 12 | 4 |
| 6 | 61 | 53 | 45 | 37 | 29 | 21 | 13 | 5 |
| 7 | 62 | 54 | 46 | 38 | 30 | 22 | 14 | 6 |
| 8 | 63 | 55 | 47 | 39 | 31 | 23 | 15 | 7 |

OUTPUT PORT NUMBER ↓

Fig. 11B

INPUT PORT NUMBER →

| | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| PCB1  | 240 | 112 | 224 | 96  | 208 | 80 | 192 | 64 | 176 | 48 | 160 | 32 | 144 | 16 | 128 | 0 |
| PCB2  | 248 | 120 | 232 | 104 | 216 | 88 | 200 | 72 | 184 | 56 | 168 | 40 | 152 | 24 | 136 | 8 |
| PCB3  | 241 | 113 | 225 | 97  | 209 | 81 | 193 | 65 | 177 | 49 | 161 | 33 | 145 | 17 | 129 | 1 |
| PCB4  | 249 | 121 | 233 | 105 | 217 | 89 | 201 | 73 | 185 | 57 | 169 | 41 | 153 | 25 | 137 | 9 |
| PCB5  | 242 | 114 | 226 | 98  | 210 | 82 | 194 | 66 | 178 | 50 | 162 | 34 | 146 | 18 | 130 | 2 |
| PCB6  | 250 | 122 | 234 | 106 | 218 | 90 | 202 | 74 | 186 | 58 | 170 | 42 | 154 | 26 | 138 | 10 |
| PCB7  | 243 | 115 | 227 | 99  | 211 | 83 | 195 | 67 | 179 | 51 | 163 | 35 | 147 | 19 | 131 | 3 |
| PCB8  | 251 | 123 | 235 | 107 | 219 | 91 | 203 | 75 | 187 | 59 | 171 | 43 | 155 | 27 | 139 | 11 |
| PCB9  | 244 | 116 | 228 | 100 | 212 | 84 | 196 | 68 | 180 | 52 | 164 | 36 | 148 | 20 | 132 | 4 |
| PCB10 | 252 | 124 | 236 | 108 | 220 | 92 | 204 | 76 | 188 | 60 | 172 | 44 | 156 | 28 | 140 | 12 |
| PCB11 | 245 | 117 | 229 | 101 | 213 | 85 | 197 | 69 | 181 | 53 | 165 | 37 | 149 | 21 | 133 | 5 |
| PCB12 | 253 | 125 | 237 | 109 | 221 | 93 | 205 | 77 | 189 | 61 | 173 | 45 | 157 | 29 | 141 | 13 |
| PCB13 | 246 | 118 | 230 | 102 | 214 | 86 | 198 | 70 | 182 | 54 | 166 | 38 | 150 | 22 | 134 | 6 |
| PCB14 | 254 | 126 | 238 | 110 | 222 | 94 | 206 | 78 | 190 | 62 | 174 | 46 | 158 | 30 | 142 | 14 |
| PCB15 | 247 | 119 | 231 | 103 | 215 | 87 | 199 | 71 | 183 | 55 | 167 | 39 | 151 | 23 | 135 | 7 |
| PCB16 | 255 | 127 | 239 | 111 | 223 | 95 | 207 | 79 | 191 | 63 | 175 | 47 | 159 | 31 | 143 | 15 |

Fig. 12A

| PCB-PP | | OUTPUT PORT NUMBER → | | | | | | | | | | | | | | | |
|---|---|---|---|---|---|---|---|---|---|---|---|---|---|---|---|---|---|
| | | A | | | | | | | | | | | | | | | |
| 1 | A | 0 | 1 | 2 | 3 | 4 | 5 | 6 | 7 | 8 | 9 | 10 | 11 | 12 | 13 | 14 | 15 |
| 2 | B | 16 | 17 | 18 | 19 | 20 | 21 | 22 | 23 | 24 | 25 | 26 | 27 | 28 | 29 | 30 | 31 |
| 3 | C | 32 | 33 | 34 | 35 | 36 | 37 | 38 | 39 | 40 | 41 | 42 | 43 | 44 | 45 | 46 | 47 |
| 4 | D | 48 | 49 | 50 | 51 | 52 | 53 | 54 | 55 | 56 | 57 | 58 | 59 | 60 | 61 | 62 | 63 |
| 5 | E | 64 | 65 | 66 | 67 | 68 | 69 | 70 | 71 | 72 | 73 | 74 | 75 | 76 | 77 | 78 | 79 |
| 6 | F | 80 | 81 | 82 | 83 | 84 | 85 | 86 | 87 | 88 | 89 | 90 | 91 | 92 | 93 | 94 | 95 |
| 7 | G | 96 | 97 | 98 | 99 | 100 | 101 | 102 | 103 | 104 | 105 | 106 | 107 | 108 | 109 | 110 | 111 |
| 8 | H | 112 | 113 | 114 | 115 | 116 | 117 | 118 | 119 | 120 | 121 | 122 | 123 | 124 | 125 | 126 | 127 |
| 9 | I | 128 | 129 | 130 | 131 | 132 | 133 | 134 | 135 | 136 | 137 | 138 | 139 | 140 | 141 | 142 | 143 |
| 10 | J | 144 | 145 | 146 | 147 | 148 | 149 | 150 | 151 | 152 | 153 | 154 | 155 | 156 | 157 | 158 | 159 |
| 11 | K | 160 | 161 | 162 | 163 | 164 | 165 | 166 | 167 | 168 | 169 | 170 | 171 | 172 | 173 | 174 | 175 |
| 12 | L | 176 | 177 | 178 | 179 | 180 | 181 | 182 | 183 | 184 | 185 | 186 | 187 | 188 | 189 | 190 | 191 |
| 13 | M | 192 | 193 | 194 | 195 | 196 | 197 | 198 | 199 | 200 | 201 | 202 | 203 | 204 | 205 | 206 | 207 |
| 14 | N | 208 | 209 | 210 | 211 | 212 | 213 | 214 | 215 | 216 | 217 | 218 | 219 | 220 | 221 | 222 | 223 |
| 15 | O | 224 | 225 | 226 | 227 | 228 | 229 | 230 | 231 | 232 | 233 | 234 | 235 | 236 | 237 | 238 | 239 |
| 16 | P | 240 | 241 | 242 | 243 | 244 | 245 | 246 | 247 | 248 | 249 | 250 | 251 | 252 | 253 | 254 | 255 |

ATM SWITCH DEVICE CONSTRUCTED FROM BANYAN NETWORK AND ITS INSTALLATION METHOD

CLAIM OF PRIORITY

This application makes reference to, incorporates the same herein, and claims all benefits accruing under 35 U.S.C §119 from an application entitled ATM Switch Device Constructed from Banyan Network and its Installation Method earlier filed in the Korean Industrial Property Office on Dec. 26, 1995, and there duly assigned Ser. No. 56580/1995 by that Office.

BACKGROUND OF THE INVENTION

1. Field of the Invention

The present invention relates to a switching device of asynchronous transfer mode (ATM) constructed from Banyan network. More particularly, the present invention relates to a device designed to construct a switch network with a large capacity in which unit switches are modulized in a certain scale and installed in a three-dimensional structure.

2. Description of the Related Art

In the ATM switch network, some switch network constructed from Banyan network has been widely used. The ATM switch network needs capacity to provide the transmission rate of several hundreds Mb/s per port and, the switch network scale should become larger accordingly. However, the actual embodiment of large-scale Banyan network is quite difficult due to the following several hardware limitations, such as parts compliance in printed circuit board (PCB), PCB size, PCB connector pin number and number of connector, transmission rate per link and attenuation of signal. On this matter, among the exemplars of a contemporary practice are White (U.S. Pat. No. 5,546,540, Automatic Topology Monitor For Multi-Segment Local Area Network, Aug. 13, 1996) discussing an automatic topology monitor for multi-segment local area network, which includes segment monitor nodes which report the presence of new end nodes to a network manager node. Dobbins et al. (U.S. Pat. No. 5,509,123, Distributed Autonomous Object Architectures For Network Layer Routing, Apr. 16, 1996) discusses an object-oriented architecture for network layer routing which distributes function and system behavior into automomous router objects. Christensen et al. (U.S. Pat. No. 5,491,687, Method And System In A Local Area Network Switch For dynamically Changing Operating Modes, Feb. 13, 1996) discusses a local area network (LAN) switch having means for switching modes of operation in response to a rate at which frames having an error pass through such a LAN switch. Judd et al. (U.S. Pat. No. 5,465,251, Network Addressing, Nov. 7, 1995) discusses a network addressing scheme in which a message sent from a source node to a destination node includes a path address which defines the path over which the message should travel to reach the destination node. Norizuki et al. (U.S. Pat. No. 5,357,510, Apparatus And A Method For Supervising And Controlling ATM Traffic, Oct. 18, 1994) discusses an apparatus for supervising and controlling asynchronous transfer mode (ATM) traffic, and which collects traffic information. The apparatus comprises a cell detecting unit, an idle cell detecting unit, a cell counting unit, an idle cell counting unit, an idle cell rate detecting unit, and a control unit. From my study of these exemplars and of the prior art, I believe that there is a need for a more effective and improved switching device of asynchronous transfer mode (ATM) constructed from Banyan network, as in the present invention.

SUMMARY OF THE INVENTION

Accordingly, an object of the present invention is to provide an improved switching device of asynchronous transfer mode (ATM) constructed from Banyan network.

Another object of the present invention is to provide an improved device designed to construct a switch network with a large capacity in which unit switches are modulized in a certain scale and installed in a three-dimensional structure.

Another object of the present invention is to provide a device designed to construct an asynchronous transfer mode (ATM) switch network based on Banyan network wherein circuit boards consisting of switch network are modulized into unit switches with certain scale and these unit switches are installed in a three-dimensional structure.

Another object of this invention is to provide a device in which plural unit switches may be assembled into one circuit board, when an asynchronous transfer mode (ATM) switch network is embodied in a three-dimensional structure.

Another object of this invention is to provide a back board connector wherein the port numbers of unit switches are again provided to connect the unit switches, when an asynchronous transfer mode (ATM) switch network is embodied in a three-dimensional structure.

In order to fulfill one or more objects of this invention, there is provided an asynchronous transfer mode (ATM) switch device constructed from Banyan network using unit switches wherein unit switches placed at the front part of the switching device are partitioned by the front-end unit switches. Unit switches at the rear part of the switching device are portioned by the rear-end unit switches. The front-end unit switches with same distance are arranged horizontally; the rear-end unit switches with same distance are arranged vertically; then, the output ports of the horizontally-arranged front end unit switches are orthogonally in order connected to input ports of vertically-arranged rear-end unit switches at the rear-end.

In order to fulfill the other object of this invention, there is provided an ATM switch device in a three-dimensional structure constructed from Banyan network using unit switches wherein plurality of unit switches is shuffled so as to maintain characteristics of Banyan network and assembled to one circuit board. The circuit boards placed at the front end of back board connector are arranged horizontally; the circuit boards placed at the rear end of back board connector are arranged vertically; the output links at the front-end circuit boards and input links at the rear-end circuit boards are directly connected to the back board connector.

BRIEF DESCRIPTION OF THE DRAWING

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 7 illustrates sequential port numbers, wherein

FIG. 10 illustrates sequential port numbers, wherein FIG. 10A is a drawing illustrating a sequential input port number of 16*16 Banyan network having the same structure as FIG. 9, and FIG. 10B is a drawing illustrating a sequential output port number of 16*16 Banyan network;

FIG. 11A is a drawing illustrating a sequential input port number of 64*64 Banyan network, and FIG. 11B is a drawing illustrating a sequential output port number of 64*64 Banyan network;

FIG. 12A is a drawing illustrating a sequential input port number of 256*256 Banyan network, and FIG. 12B is a drawing illustrating a sequential output port number of 256*256 Banyan network;

FIG. 21 is a drawing illustrating a pin-to-pin connection relationship between inter-pins of each connector and unit switches from 1,024×1,024 back board connector in a three-dimensional structure.

DETAILED DESCRIPTION OF THE PREFERRED EMBODIMENT

Figure 1:
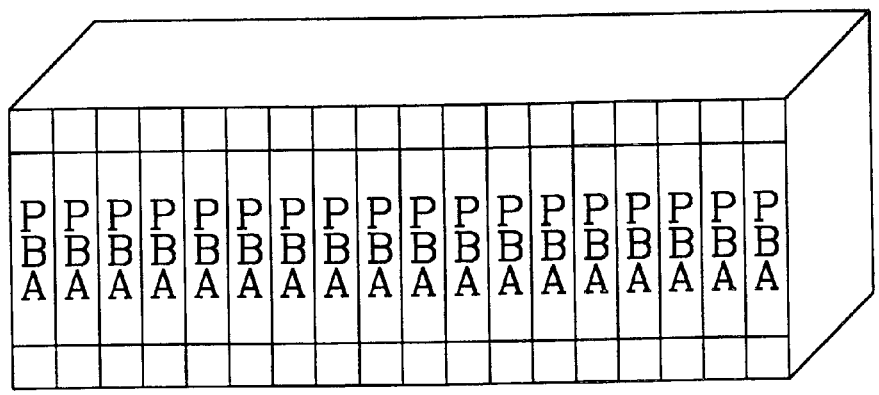
FIG. 1 is a drawing illustrating a front view of a switching device of a contemporary practice, when a switching device is installed in the structure of block shelf.

Now, a preferred embodiment of the present invention will be described in detail with reference to the accompanying drawings. Throughout the drawings, it is noted that the same reference numerals or letters will be used to designate like or equivalent elements having the same function. In the following description, numerous specific details such as components composing a concrete circuit and expressions are set forth to provide a more thorough understanding of the present invention. It will be apparent, however, to one skilled in the art that the invention may be practiced without these disclosed specific details. The detailed descriptions of known function and constructions unnecessarily obscuring the subject matter of the present invention will be avoided hereinafter.

Figure 2:
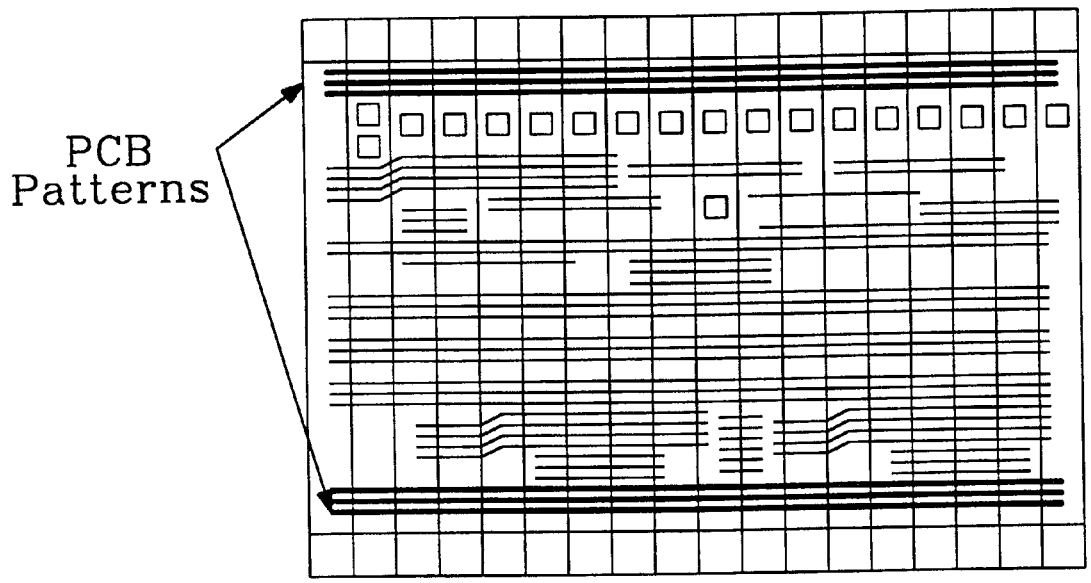
FIG. 2 is a drawing illustrating of a switching device of a rear view of a wiring shape of electric signal, when a switching device is installed in the structure of block shelf.

FIGS. 1 and 2 illustrate a contemporary practice, in which each process installs the block shelf construction, embodying a large-scale ATM switch network constructed from Banyan network. FIG. 1 shows a front view of switching device embodied by the process of installing the block shelf structure, and FIG. 2 shows a rear view of switching device embodied by the process of installing the block shelf structure. As illustrated in FIG. 1, a switching device of a contemporary practice has embodied a large-scale switch network by dispersing it to a plurality of circuit boards (PBA) and these circuit boards are installed in the form of a block shelf. The aforementioned process for installing the block shelf construction has been frequently employed in the communication system (e.g., electronic switching system) and as illustrated in FIG. 2, the connection among unit circuit boards consisting of total switch network may be available via an electric signal line (PCB pattern) of back board.

In a large-scale ATM switch network requiring high-speed signal transfer, however, the installation of circuit boards consisting of the switch network as a block shelf structure has the following disadvantages:

In a large-scale switch network, the links which should be connected circuit boards consisting of switch network are on the increase to a certain extent but owing to its excessive links, it is nearly impossible to accommodate them in a current hardware environment. This is because limited connector pins applicable to these circuit boards leads to the increasing number of links which may be connected between circuit boards and at the back board of switch network, the electric signal (PCB pattern) connecting to the circuit boards plays a role of limiting the transfer length and the applicable number of links. Hence, it appears that these problems are thought to be settled by enlarging the size of the circuit board and using a large number of connectors, but the size enlargement of the circuit board may induce the board's bending, thus making it difficult to maintain the circuit board in a stable manner.

In a method of installing such a block shelf structure, circuit boards are provided at next in due sequence and the more they are away from the first board, the longer there are link length connected to the board. As illustrated in FIG. 2, therefore, the length of gang link among all boards gang link becomes different in accordance with the separation distance among boards. In the ATM switch network, signal transmission rate per port reaches several hundreds of Mb/s and if the lengths of internal gang link with the switch network are different each other, signal transfer jitter may occur. The signal jitter is derived from a high-speed signal transfer as seen in ATM and such jitter becomes troublesome, when all links related data in internal operation, as shown in most of switch network, is coincided with clock phase periodically.

In addition, such a block shelf installation method is limited by the length of a high-speed signal transfer and as illustrated in FIG. 2, signal damping prevents the circuit boards, being far away, from transmitting the signal normally. In a situation of a signal transfer having 160 Mb/s, the transmission rate per bit is about 6.25 E-9 but PCB the transmissible distance by PCB pattern without signal damping is merely several centimeters. In this respect, since the block shelf installation method has a circuit board distance ranging from minimum several centimeters to several tens of centimeters, it is absolutely tinder signal damping.

Figure 3:
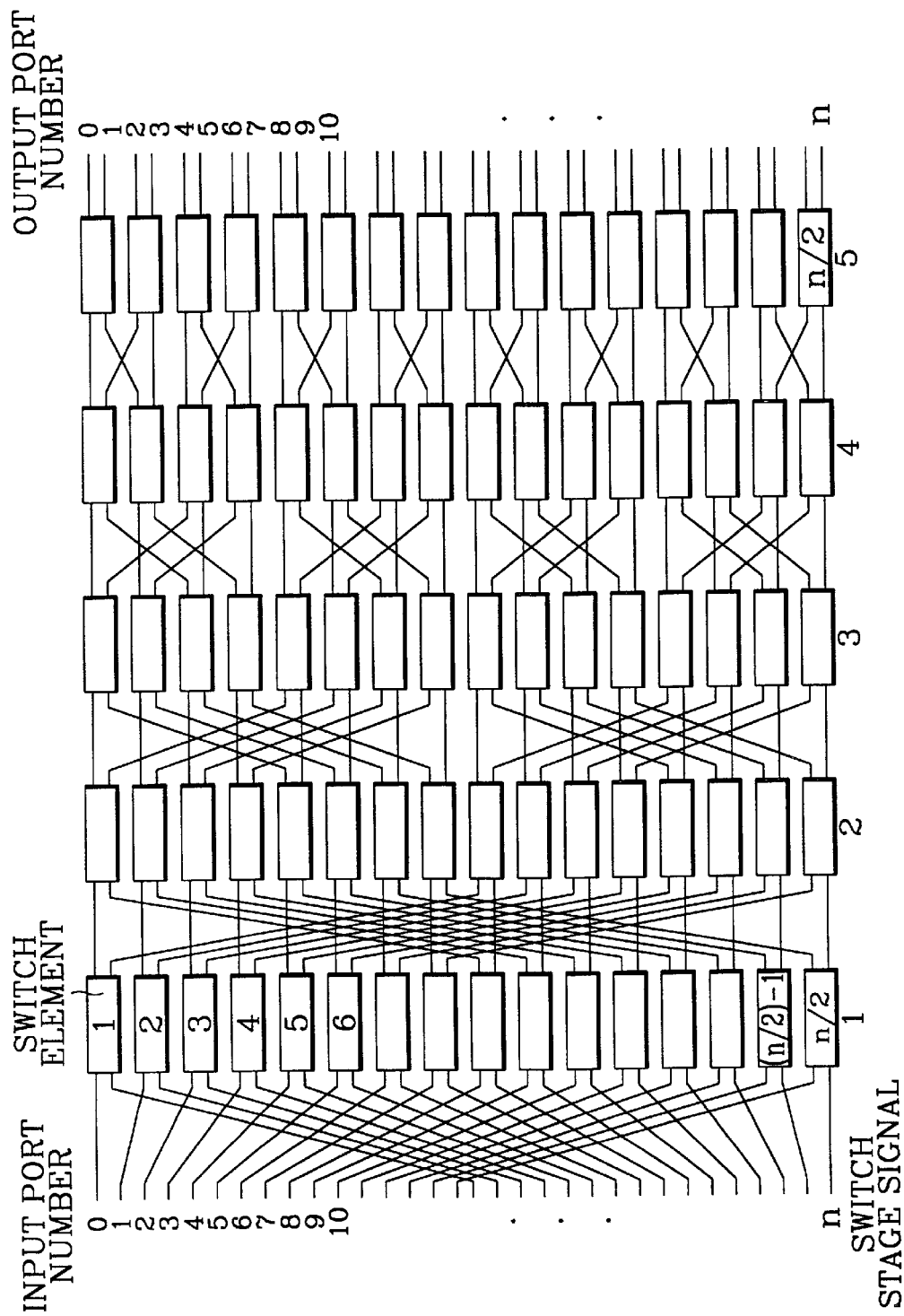
FIG. 3 is a drawing illustrating the structure of unit switches with certain modulability based upon Banyan network.
Figure 4:
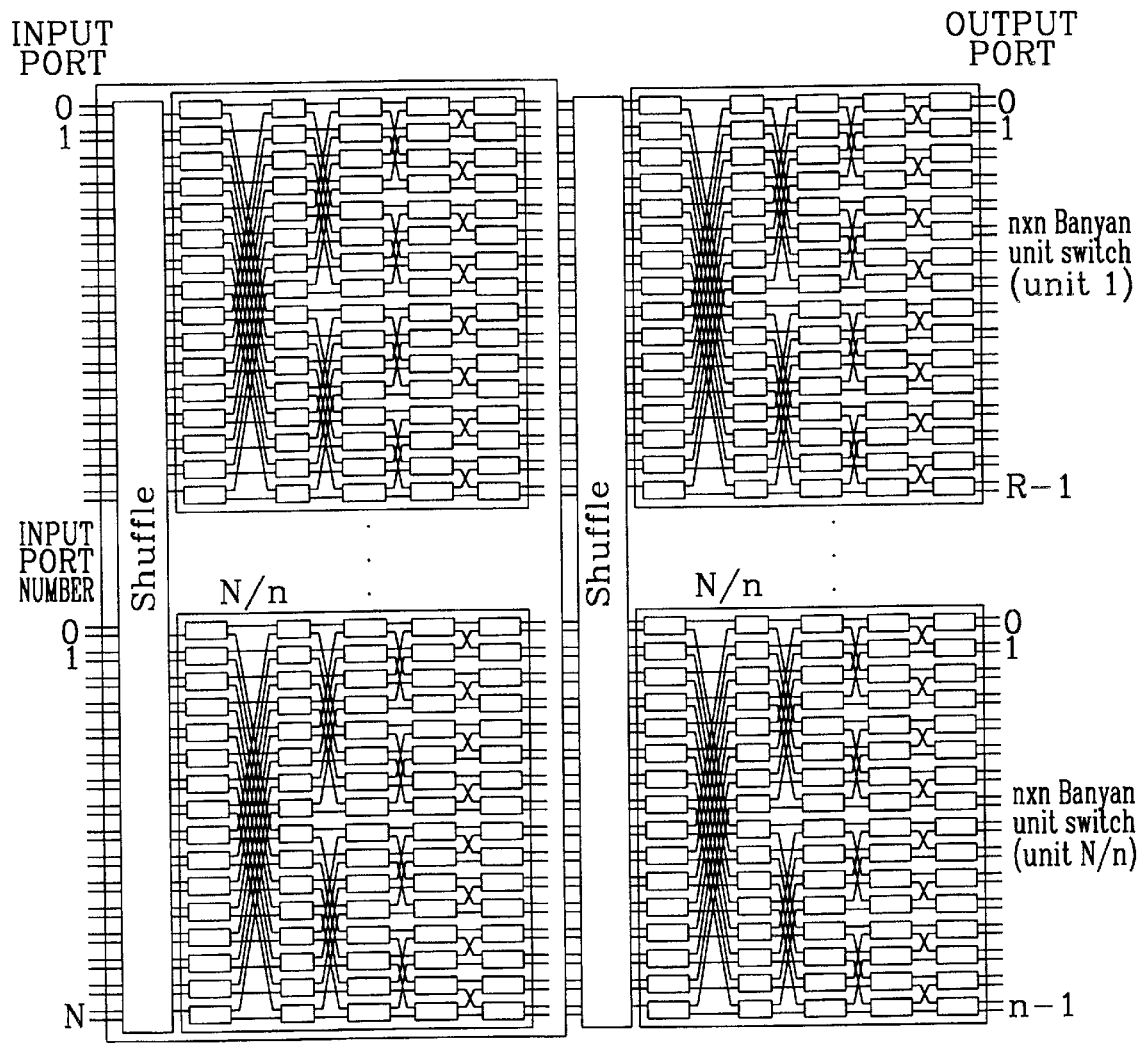
FIG. 4 is a drawing illustrating an ATM switching device based upon Banyan network.

In consideration of such restrictive factors, this invention describes a process of constructing a large-scale Banyan networks. In embodying a large-scale Banyan network in N*N size of this invention, the fundamental method is to employ unit switches in n*n scale and these unit switches are utilized in a method of installing a three-dimensional structure, thus constructing a large-capacity switch network. FIG. 3 shows an unit switch structure in n*n scale from Banyan network, and FIG. 4 shows the switching device in n*n scale by connecting these unit switches. Hence, "N" means the number of input/output port and "n" means the input/output port in an unit switch.

To be free from the aforementioned shortcomings, this invention suggests a method of embodying a switch network. As illustrated in FIG. 3, this invention comprises in that a large-scale switch network based on Banyan network is modulized into unit switches in n*n size and using these unit switches, the total switch network is constructed in a method of installing a three-dimension structure.

Hence, the modulization of the total switch network into unit switches in n*n size as illustrated in FIG. 3, is to make an easy embodiment of a three-dimensional structure. Namely, when a large-scale switch network based on Banyan network is embodied as a hardware, the circuit volume of accommodating semiconductor and circuit board is restricted so that the partition should be inevitable. Thus, the total switch network is composed of parted small-scale switches. Hence, given the fabrication of small-scale switches by the partition of total switch network, its modulability will be determined. If the unit switches have modulability, the total switch network may be constructed, using plural unit switches in same scale and hence, there is one type of unit switches. If small-scale switches are parted irrespective of modulability, however, the total switch network should be constructed, using several types of small-scale switches.

After construction of unit switch in n*n with modulability, the construction of total switch network consisting of the unit switches is made available by the method of installing a three-dimensional structure. Such a three-dimensional installation method may significantly rectify some aforementioned shortcomings recognized in the block shelf construction. Namely, this three-dimensional installation method is such that its link connection among unit switches may be available via connector directly on a back board, unlike the block shelf installation method where its link is linked to electric signal line on a back board. As illustrated in FIG. 4, when switch networks in N*N scale is embodied, it is unnecessary to connect signal links of N pieces into electric signal line on a back board. As shown in the above FIG. 4, when the switch network in N*N scale is constructed, the number of gang links (among input link, output link and unit switch) is N pieces (respectively). As a result, any transfer jitter does not occur among the links used for connecting the unit switches and signal damping largely disappears.

When the ATM switching device of Banyan network system according to this invention is constructed in a three-dimensional structure, the circuit boards having the scale of unit switches are directly connected at the front and rear end of the shelf and installed thereof. Hence, the length of the shelf is extended but the distance among circuit boards become shortened significantly compared with that in a block shelf structure. Therefore, when any signal at high speed is transferred in the three-dimensional switch network, signal damping becomes negligently small.

According to this invention, the method of installing unit switches (circuit board) consisting of switch network in a three-dimensional structure is that the total unit switches divided by the half are arranged; the unit switches (hereinafter referred to as "front-end unit switch") arranged at the front-end is placed horizontally, while the unit switches (hereinafter referred to as "rear-end unit switch") arranged at the rear-end is placed vertically. The front-end and rear-end unit switches are connected vertically, thereby addressing with some problems associated with the block shelf structure, as mentioned in the above. Namely, if a three-dimensional structure is applied for installing unit switches, these front-end and rear-end unit switches may be directly connected without shuffling and thus, any separate electric signal line or cable for link connection thereto is unnecessary. With uniformed links in length, any jitter does not occur in signal transfer and there is better improvement in signal damping.

Examples of installing circuit boards in the unit switch scale are described in more detail as set forth as follows.

Figure 5:
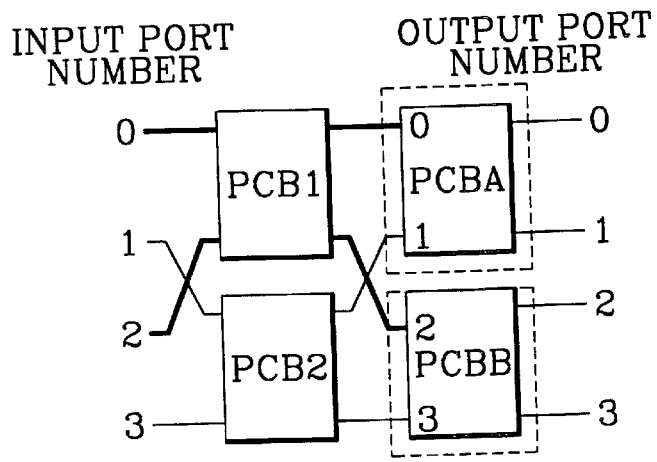
FIG. 5 is a drawing illustrating a structure of a ATM switching device based upon 4*4 Banyan network.
Figure 6:
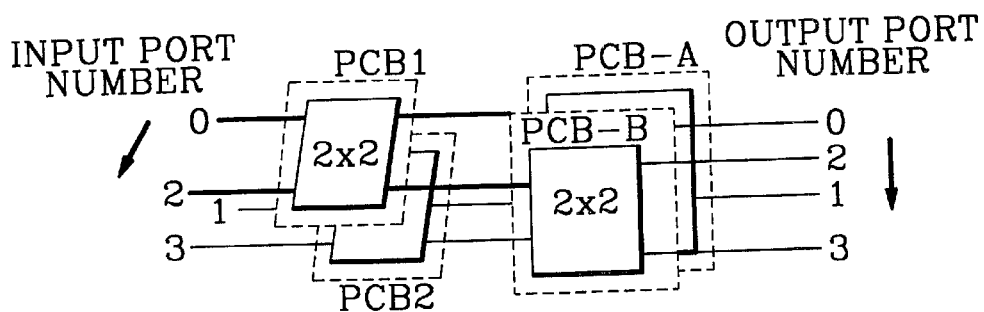
FIG. 6 is a drawing illustrating the shape of installing 4*4 switch network having the same structure as FIG. 5 in a three-dimensional structure, according to the principles of the present invention.
Figures 7A, 7B:
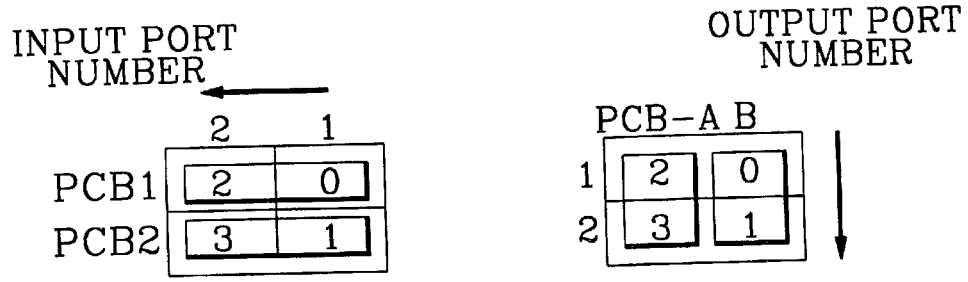
FIG. 7A is a drawing illustrating a sequential input port number of 4*4 Banyan network having the same structure as FIG. 5.
FIG. 7B is a drawing illustrating a sequential output port number of 4*4 Banyan network.

FIG. 5 illustrates an example of constructing 4*4 Banyan network using 4 unit switches in 2*2 scale. FIG. 6 illustrates an example of installing Banyan network of the FIG. 5 in a three-dimensional structure according to this invention. FIG. 7A illustrates the sequential order of input port number, when installed in FIG. 6. FIG. 7B illustrates the sequential order of output port number, when installed in FIG. 6.

Referring to the drawings, the method of installing 4*4 Banyan network in a three-dimensional structure is discussed as follows: First, in a 4*4 Banyan network illustrated in FIG. 5, unit switches are divided into the half for classifying PCB1–PCB2 and PCBA–PCBB; the front-end unit switch PCB1–PCB2 arranged at the front part is placed horizontally, while rear-end unit switch PCBA–PCBB arranged at the rear part is placed vertically. Hence, input port number of the front-end unit switch PCB1–PCB2 is arrayed as illustrated in FIG. 7A, while the output number of rear-end unit switch PCBA–PCBB is arrayed as illustrated in FIG. 7B. Therefore, if the front-end and rear-end unit switches are directly connected to Banyan network as illustrated in FIG. 5, output ports of front-end unit switches and input ports of rear-end unit switches are automatically connected. In consequence, Banyan network as illustrated in FIG. 6 may be installed in a three-dimensional structure as illustrated in FIG. 6.

Figure 8:
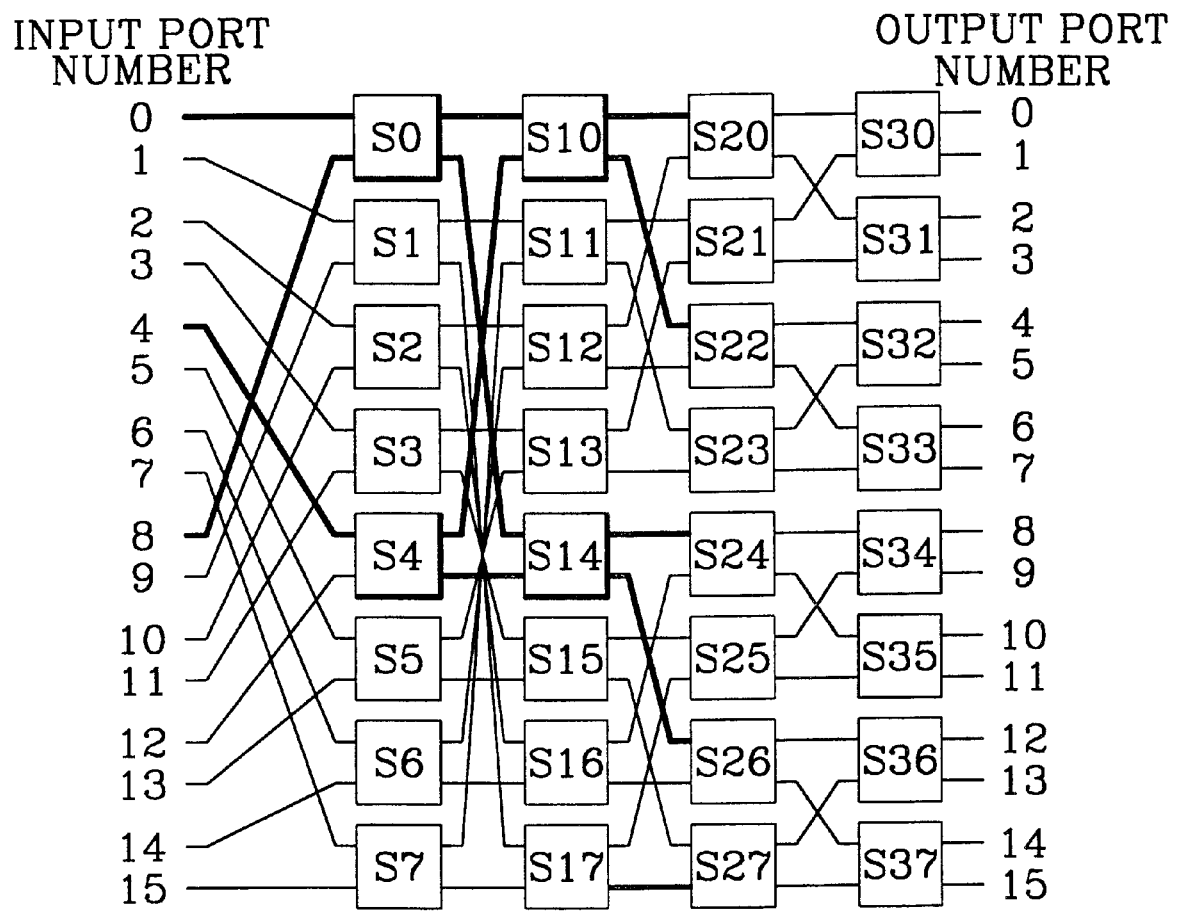
FIG. 8 is a drawing illustrating the structure of ATM switching device consisting of 16*16 Banyan network.

FIG. 8 illustrates an example of constructing 16*16 Banyan network and hence, input ports of switches at the first stage of switch network are constructed by shuffling. Hence, S0–S7 at the first stage and S10–SI7 at the second stage are connected in a certain rule. Namely, the output port of S4 switch is connected to the input port of S10, while the output port of SI is connected to the input port of S14. Therefore, one unit switch may be constructed by combining switches (S0, S4, S10 and S14). The rule is also applied to switches (S1, S5, S11 and S15), switches (S2, S6, S12 and S16) and switches (S3, S7, S13 and S17). Therefore, 16*16 Banyan network has a certain modulability. Namely, the input port number of front-end unit switches (FIG. 8) has a certain rule, as illustrated in Figure. In this respect, in the front-end unit switches from the 16*16 Banyan network, switches (S0, S4, S10 and S14) are prepared as unit switches of PBA1; switches (S1, S5, S11 and S15) as unit switches of PBA2; switches (S2, S6, S12 and S16) as PBA3 unit switches of PBA3; switches (S3, S7, S13 and S17) as unit switches of PBA4 unit. The PBA1 to PBA4 unit switches become the front-end unit switches.

From the switch network (FIG. 8), the output port numbers of rear-end unit switches has the same rule as FIG. 10B. In this respect, from the rear-end unit switches, switches (S20, S21, S30 and S31) are prepared as unit switches of PBAA; switches (S22, S23, S32 and S33) as unit switches of PBAB; switches (S24, S25, S34 and S35) as unit switches of PBAC; switches (S26, S27, S36 and S37) as unit switches of PBAD.

Figure 9:
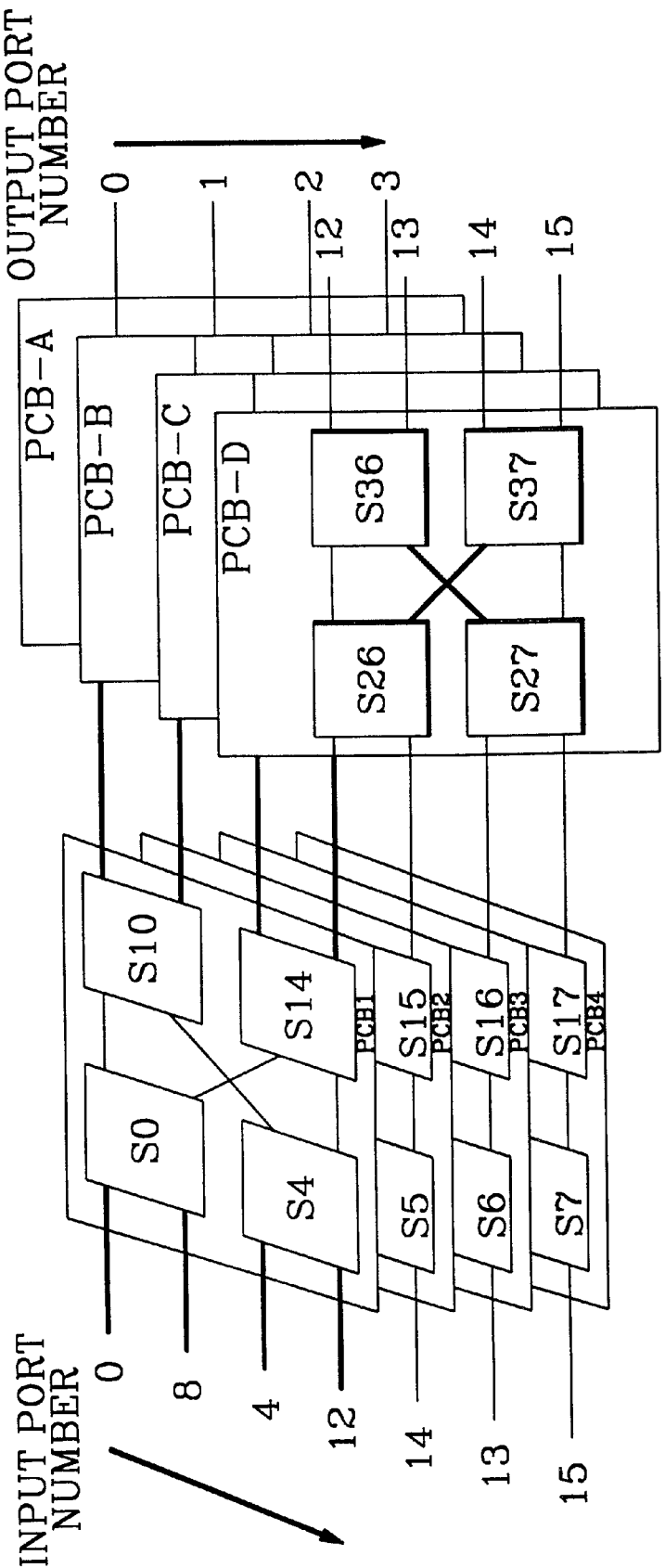
FIG. 9 is a drawing illustrating the shape of installing 16*16 switch network having the same structure as FIG. 8 in a three-dimensional structure, according to the principles of the present invention.

In accordance with FIG. 8 where 16*16 Banyan network is installed in a three-dimensional structure, the switch network is constructed as FIG. 9. Namely, the unit switches are divided into the half for classifying PCB1–PCB4 and PCBA–PCBD; the front-end unit switch PCB1–PCB4 arranged at the front part is placed horizontally, while rear-end unit switch PCBA–PCBD arranged at the rear part is placed vertically. Hence, input port number of the front-end unit switch PCB1–PCB4 is arrayed as illustrated in FIG. 10A, while the output number of rear-end unit switch PCBA–PCBD is arrayed as illustrated in FIG. 10B. Therefore, if the front-end and rear-end unit switches are directly connected in Banyan network as illustrated in FIG. 8, output ports of front-end unit switches and input ports of rear-end unit switches are automatically connected.

When Banyan network is constructed as aforementioned, n*n unit switch with a certain rule should be modulized. Hence, when 64*64 Banyan network is installed in a three-dimensional structure, unit switches should be modulized as illustrated in FIGS. 11A and 11B. In this case, unit switches become 8*8 Banyan network. Hence, the FIG. 11A illustrates the sequential input port number order of PCB1–PCB8, front-end unit switches, while FIG. 11B illustrates the sequential input port number order of PBAA–PBAH, rear-end unit switches.

Further, when 256*256 Banyan network is constructed in a three-dimensional structure, unit switches should be modulized as illustrated in FIGS. 12A and 12B. In this case, unit switches become 16*16 Banyan network. Hence, the FIG. 12A illustrates the sequential input port number order of PCB1–PCB16, front-end unit switches, while FIG. 12B illustrates the sequential input port number order of PBAA–PBAP, rear-end unit switches.

Figure 13:
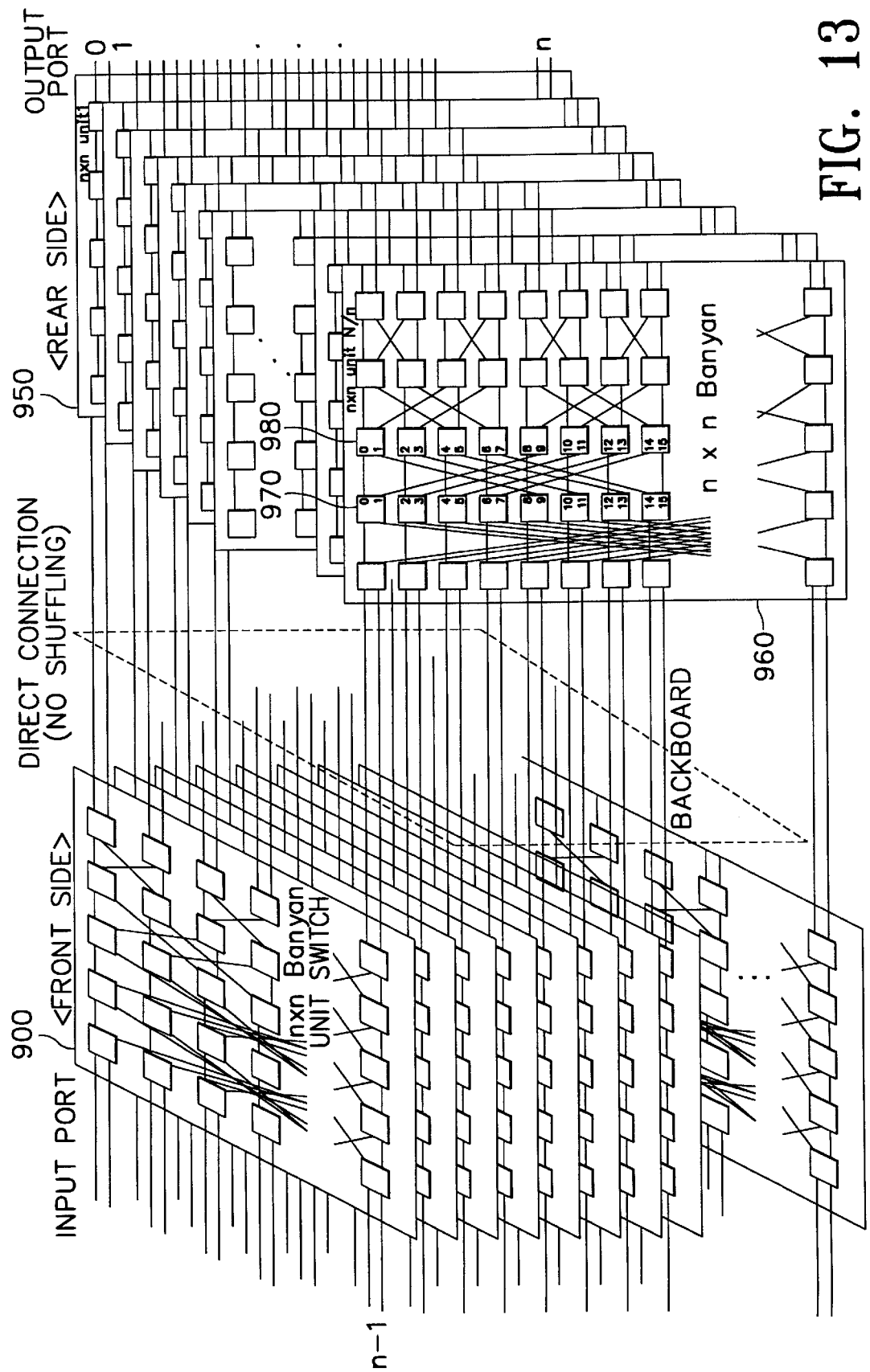
FIG. 13 is a drawing illustrating the type of constructing ATM switch network in a three-dimensional structure according to this invention.

FIG. 13 illustrates large-scale switch network constructed in a three-dimensional structure using unit switches. The unit switches consisting of the N*N switch network is prepared by one circuit board (PBA) and these unit switches are modulized with a certain rule. Such n*n unit switches have a connection structure, which is the same as FIG. 3.

Figure 14:
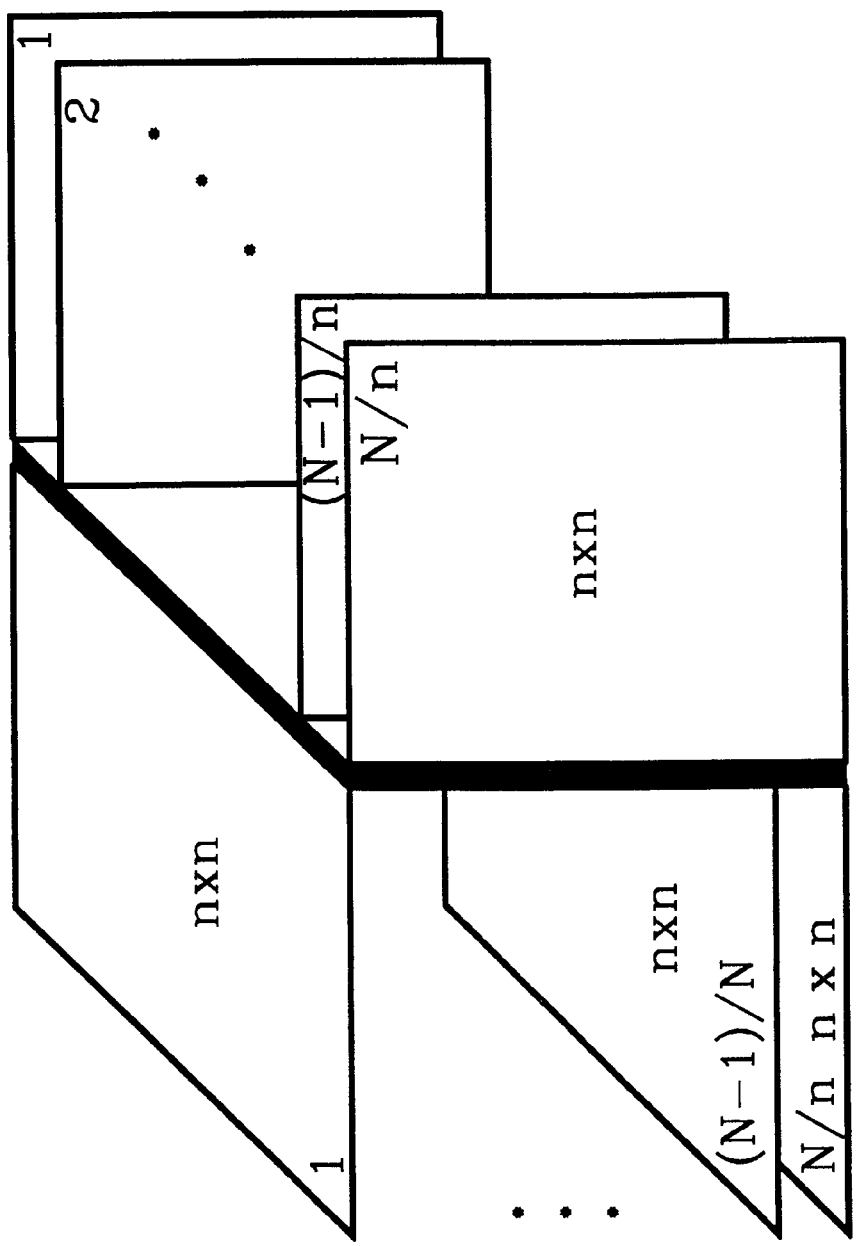
FIG. 14 is a drawing illustrating an outer shape of switch network being installed with three-dimensional structure according to this invention.

Referring to FIG. 13, the N*N switch network is installed in a three-dimension structure; At the center of back board, unit switches divided by the half are arranged to left side (front end) and right side (rear end) on a back board, respectively. Then, the front-end unit switches arranged at the front side of the back board are placed vertically. The reason why the front-end unit switches and rear-end unit switches are connected vertically is to copy with some problems associated with the block shelf installation method, as mentioned in the above. Namely, if the three-dimensional method is applied for installing unit switches, the front-end unit switches and rear-end unit switches may be directly connected without shuffling and thus, any separate electric signal line (PCB pattern) or cable for link connection thereto is unnecessary. With uniformed links in length, any jitter does not occur in signal transfer and there is better improvement in signal damping. FIG. 14 illustrates the Outer shape of connecting the horizontally arranged front-end unit switches and vertically arranged rear-end unit switches, following the modulization of N*N switch network into n*n unit switches.

As explained in the above, this invention describes the example wherein the front-end unit switches with same distance are horizontally arranged and rear-end unit switches are vertically arranged. However, even if the front-end unit switches with same distance are vertically arranged and rear-end unit switches are horizontally arranged, the shuffling's modulation may lead to the same results, which is well recognized in those who have a common knowledge in this industry. An example of a direct connection without shuffle wiring is shown in FIG. 13. The input ports 900 are connected directly to output ports 950 without shuffling, as shown in FIG. 13. An example of shuffle wiring can be seen in FIG. 13. On unit 960 there are shown interconnections among outputs 970 and inputs 980. If outputs 970 are numbered 0 to 15 as shown, and inputs 980 are numbered 0 to 15 as shown, a shuffle wiring connection can be explained as follows. The first half of the outputs 970 (0-7) are connected to the even numbered inputs 980 (0,2,4,6,8,10, 12,14). The second half of the outputs 970 (815) are connected to the odd numbered inputs 980 (1,3,5,7,9,11,13,15). In this way, outputs 970 are connected to inputs 980 in an interspersed (alternating) manner. This interspersed (alternating) manner is very much like a shuffle of two halves of a deck of playing cards. Shuffled wiring connections are well known to people of ordinary skill in the art of Banyan networks, batcher networks, and asynchronous transfer mode switches.

As aforementioned, when ATM unit switches are installed in a three-dimensional structure, it is preferred to connect the front-end unit switches and rear-end unit switches using a back board.

In a large-scale switch network, based on N*N Banyan network, installed in a three-dimensional structure according to the Example of this invention, when plural unit switches are assembled to one PCB and another PCB, a back board connector is employed by shuffling connection ports among unit switches so as to maintain the characteristics of Banyan network. Meantime, according to the Example of this invention, the scale of unit switch is postulated as 32*32 and the scale of switch network as 1,024×1,024 for the convenience of explanation. Therefore, the Example of this invention describes the switch network having N=1024 and n=32 as an example. The method of installing the switch network into a three-dimensional structure according to the Example of this invention is that N×N switch network is modulized into n×n small-scale unit switch and then, plural unit switches are assembled to one PCB; the arrangement of the PCB is made to directly connect with the front-end and rear-end of back board connector where ports are arrayed so as to maintain the characteristics of Banyan network, thus connecting it to a connector on a back board.

Hence, the following matters should be considered in assembling plural unit switches to a printed circuit board (PCB):

First, the number of unit switches designed to be assembled to one PCB should be predetermined. Based on the availability how many unit switches may be assembled to one PCB, the number of PBA (PCB assembly) required for the construction of total three-dimension Banyan network become different and since the number of PBA affects the physical volume in the embodiment of switch network, the number of PBA required should be possibly reduced.

Secondly, when plural unit switches are assembled to one PCB, the method of shuffling unit switches should be predetermined. In case of assembling plural unit switches to one PCB, the connection between the front-end and rear-end unit switches should be tile same as constructed in a three-dimensional Banyan network per unit switch as illustrated in FIG. 5, in order to maintain the characteristics of Banyan network.

When the construction of 32*32 unit switches are directly arranged in a three-dimensional structure to realize 1,024*1,024 Banyan network (switch network), an object of this invention is to provide a method of enhancing PCB's performance efficiency by assembling 4 unit switches to one PCB—in this case, a novel back board connector structure and array method wherein the connection among unit switches is modulated so as to maintain the characteristics of Banyan network and the connection between the front-end unit switches and rear-end unit switches is made available via back board connector directly. The PCB's connector connected to the back board connector according to this invention, has also a same structure as the back board connector. Hence, since the connector's structure (male and female type) may be determined by a designer, this invention describes the structure and array of back board connector.

As described in the above, if a large-scale switch network with high speed is embodied, it is evident that if some shortcomings associated with the conventional three-dimensional structure may be rectified, a three-dimensional structure is more advantageous than the block shelf structure.

When 1,024×1,024 switch network based upon Banyan network is installed in a three-dimensional structure, an object of this invention is to provide a method of connecting back board connector and PBA and a novel structure of back board connector wherein PCB's performance efficiency is enhanced by assembling 4 unit switches to one PCB and the shuffling relationship between the front-end and rear-end unit switches in switch network, which are directly connected via back board connector, should maintain the characteristics of Banyan network. If the back board connectors used in this invention are arranged in specific shapes on a back board and connected to switches assembled in PBA in a certain order, they have the same characteristics as the switch network constructed in a three-dimensional structure using unit switches as illustrated in FIG. 5, as a basic unit.

Figure 15:
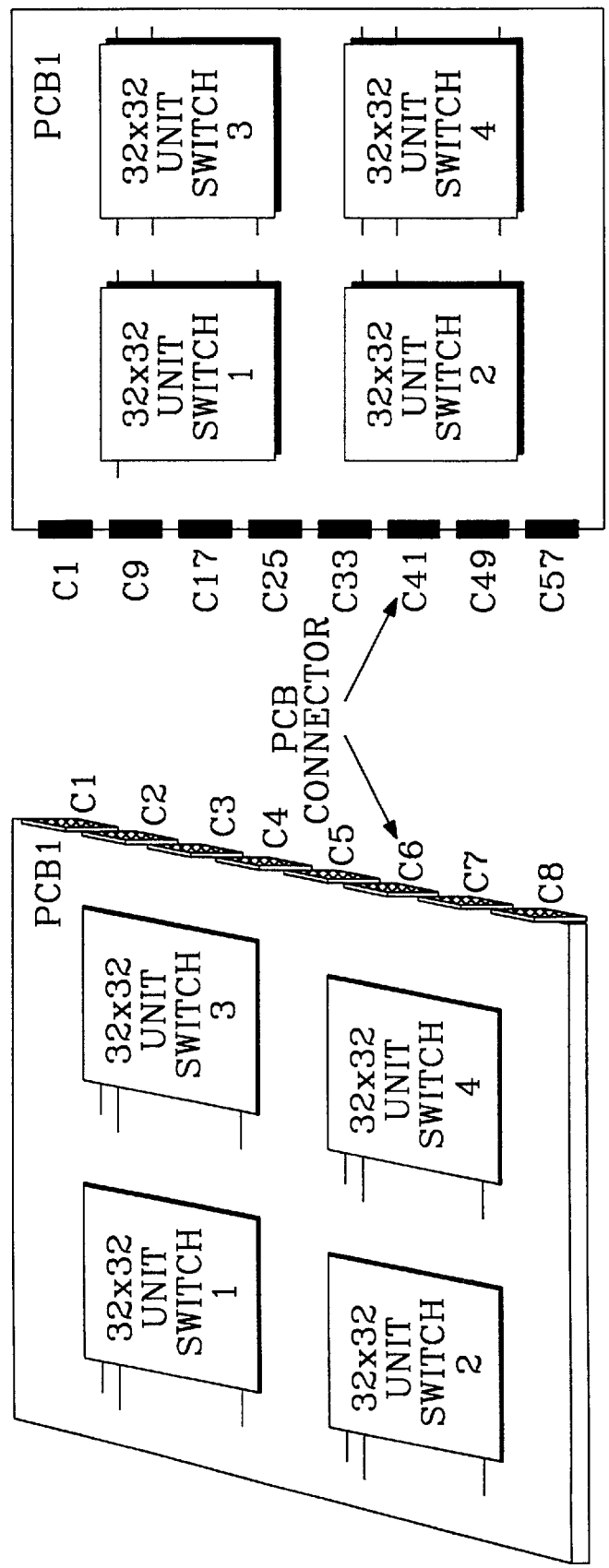
FIG. 15 is a drawing illustrating a shape of assembling a Plurality of unit switches on one circuit board according to this invention.

FIG. 15 illustrates a shape of assembling 32*32 unit switches used in 1,024×1,024 switch network in a three-dimensional structure of this invention, to PCB. From the FIG. 15, the connector connected to one end of PCB is a part in which back board connector is connected. The connector has the same structure and physical property as those of back board connector, while the characteristics selection (male/female type) at connection part is merely different.

Figure 16:
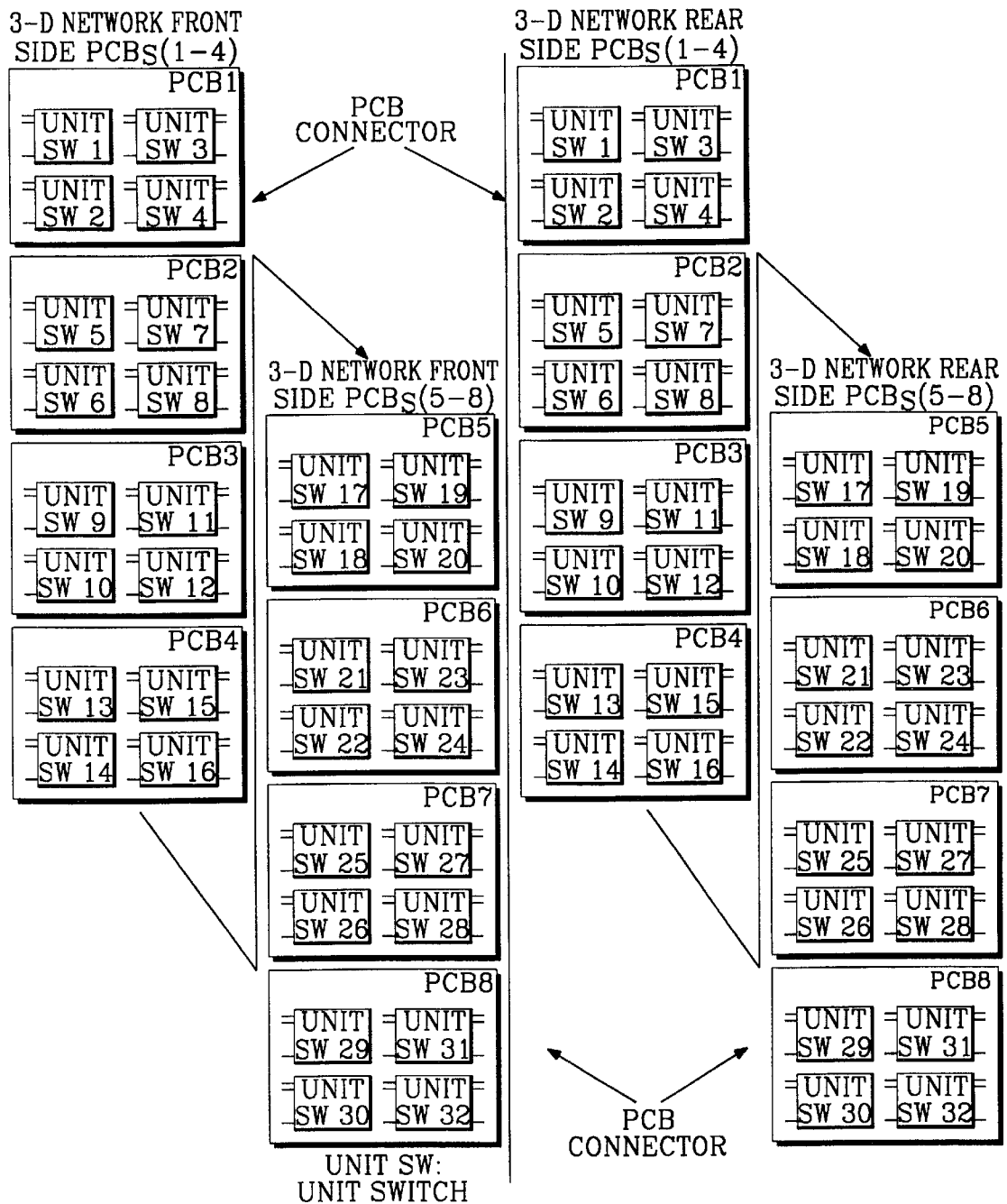
FIG. 16 is a drawing illustrating an array structure of circuit board and unit switch from 1,024×1,024 switch network in a three-dimensional structure.
Figure 17:
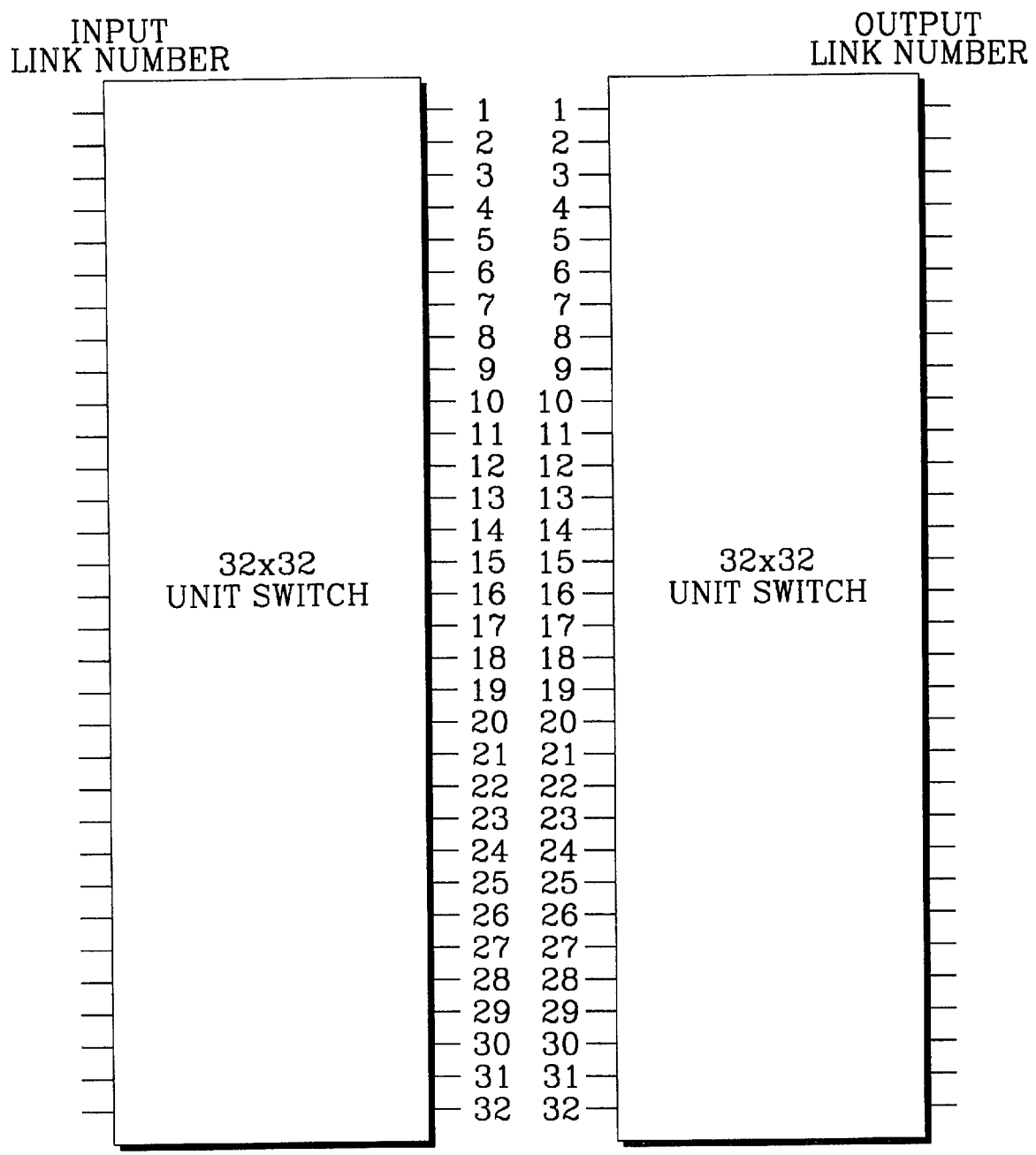
FIG. 17 is a drawing illustrating input/output link numbers from 32×32 unit switch.

4 unit switches are assembled to one PCB and the array orders of PBAs and unit switches comprising the total switch network are the same as FIG. 16. Further, the input/output pin number of the unit switches is allocated as FIG. 16. When 1,024×1,024 switch network is constructed in a three-dimensional structure using the 3202 unit switch, a total number of PBA will be 16 based on the calculation that if 4 unit switches to one PCB are assembled, 8 PBAs assembled with 32 front-end unit switches and 8 PBAs assembled with 32 unit switches of rear end are combined. Each of 8 front-end PBAs and 8 rear-end PBAs is connected via back board connector, as illustrated in FIG. 9. The Example of this invention describes that 8 PBAs of the front-end switches with same distance is horizontally arranged and 8 PBAs of the rear-end switches with same distance is vertically arranged; then, these PBAs are connected to back board connector. However, even if 8 PBAs of the front-end switches with same distance. is vertically arranged and 8 PBAs of the rear-end switches with same distance is horizontally arranged, their connection to back board connection may lead to the fulfillment of this invention, which is well recognized in those who have a common knowledge in this industry.

Figure 18:
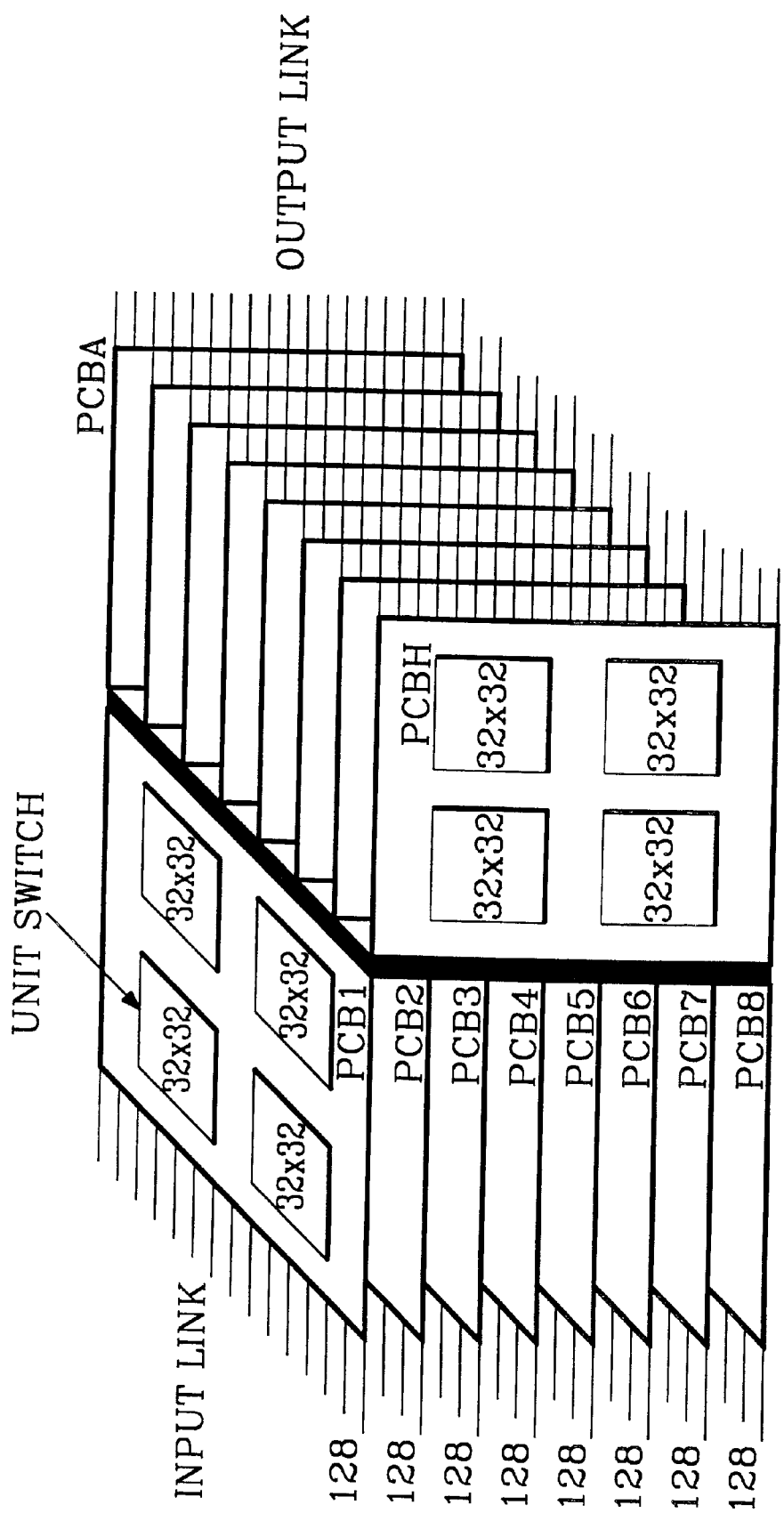
FIG. 18 is a drawing illustrating the connection between the front-end circuit boards and rear-end circuit boards of back board connector from 1,024×1,024 switch network in a three-dimensional structure.

FIG. 18 is a view illustrating the shape of connecting front-end circuit boards and rear-end circuit boards of back board connector from 1,024×1,024 switch network in a three-dimensional structure. From the FIG. 18, PCB1–PCB8 are circuit board placed at the front end of back board connector is horizontally arranged with same distance, while PCBA–PCBH are circuit board placed at the rear end of back board connector is horizontally arranged with same distance. The circuit boards at the front and rear end are directly connected to the back board connector. As mentioned in the above, this invention describes that 4 unit switches of 3202 are assembled to circuit board.

Figure 19:
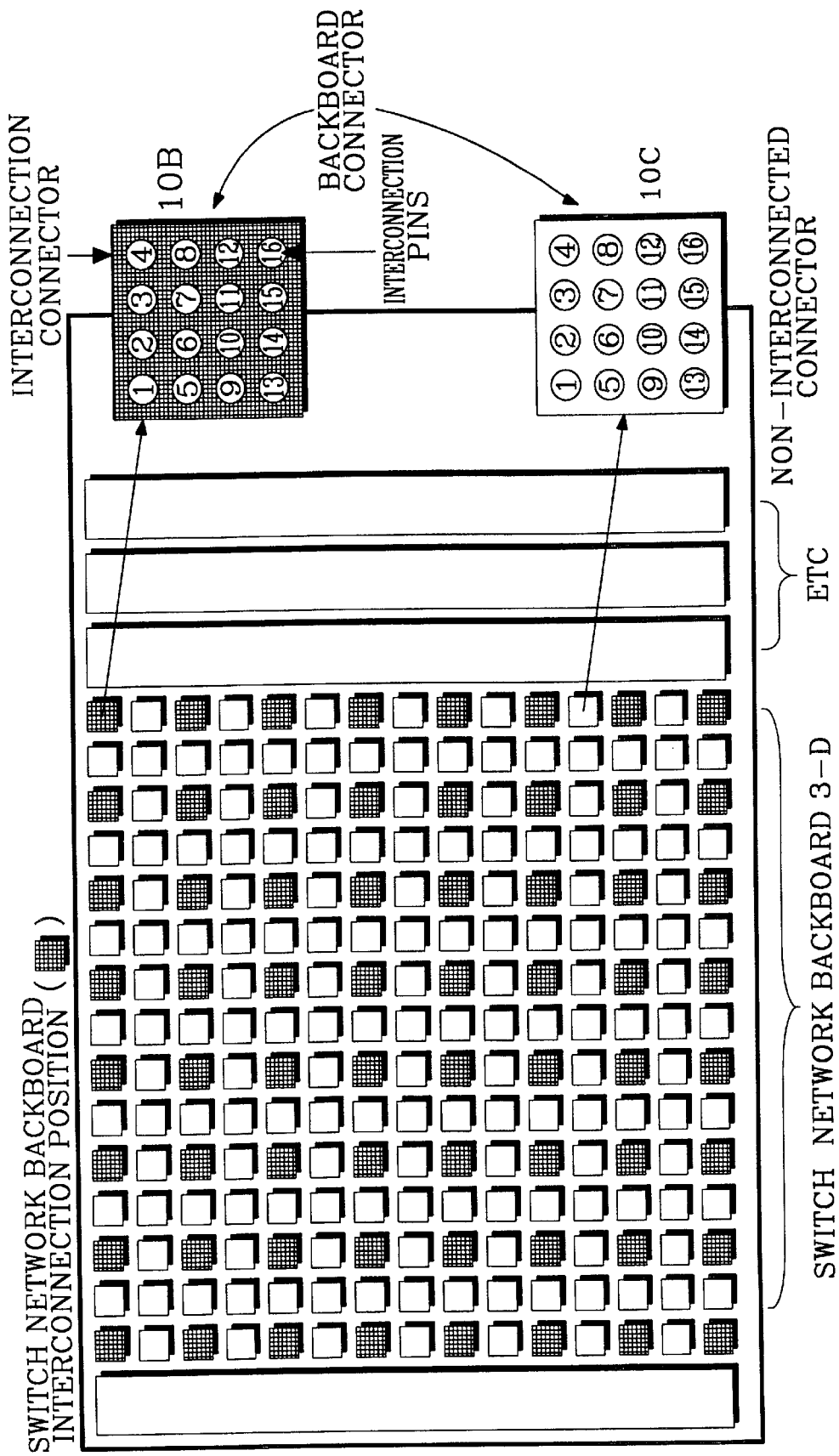
FIG. 19 is a drawing illustrating the structure of back board connector, according to the principles of the present invention.

FIG. 19 is a view illustrating the structure of back board connector according to this invention structure. FIG. 19A is a view illustrating a three-dimensional structure of back board connector comprising a connection connector and non-connection connector. Hence, the connection connector, having the same structure with 19B, is actually connected to the connector of circuit boards; the non-connection connector 19C has the same structure as 19C and does not connect to the connector of circuit board. As aforementioned, the reason why the non-connection connector is provided is to a) compensate any signal damping included by adjacent connectors when the back board connector and circuit boards are connected, and b) use an scope for connecting signal between three-dimensional structure parts and the others.

Figure 20:
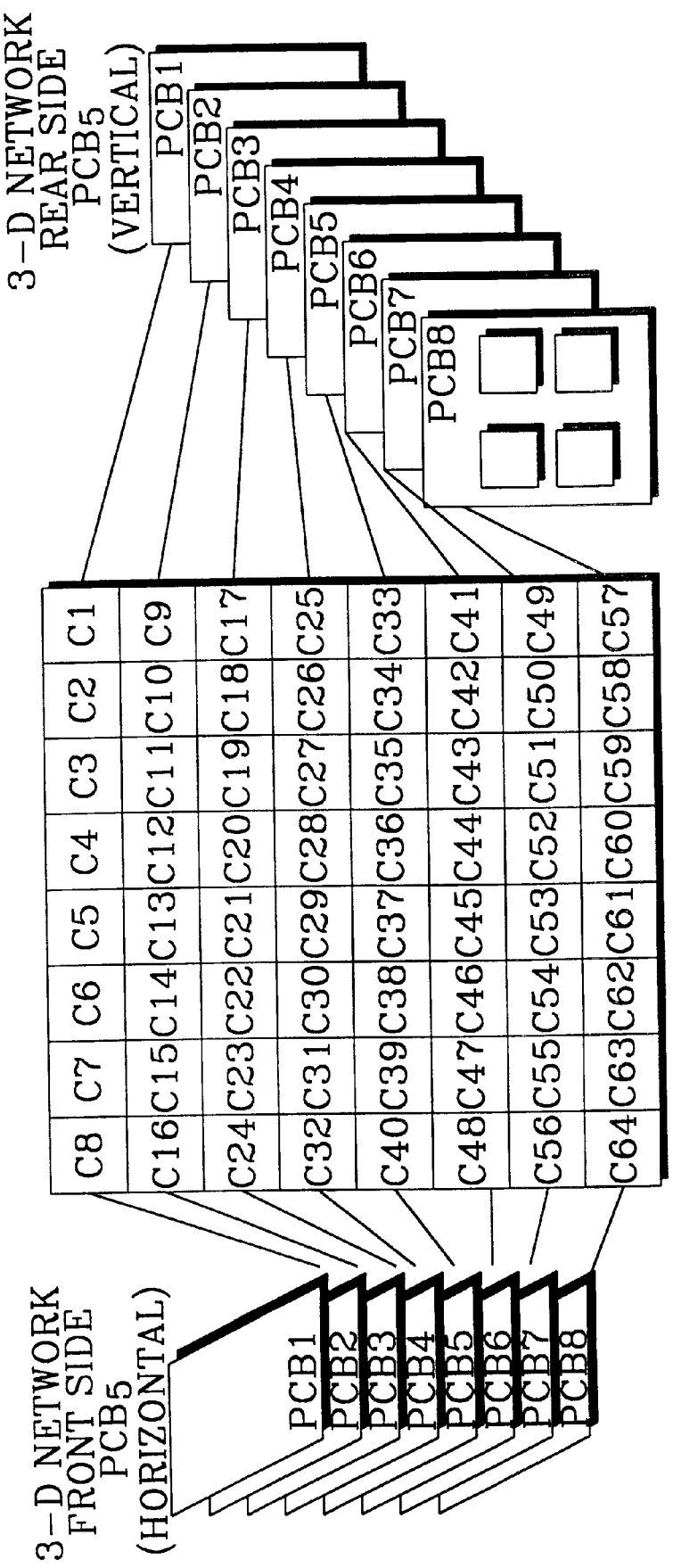
FIG. 20 is a drawing illustrating an connector array of back board connector from 1,024×1,024 switch network in a three-dimensional structure, according to the principles of the present invention.

FIG. 20 is a view illustrating connector array of back board connector from 1,024×1,024 switch network in a three-dimensional structure. C# means connection connectors' number, when switch network is constructed in a three-dimensional structure according to this invention.

Figure 21:
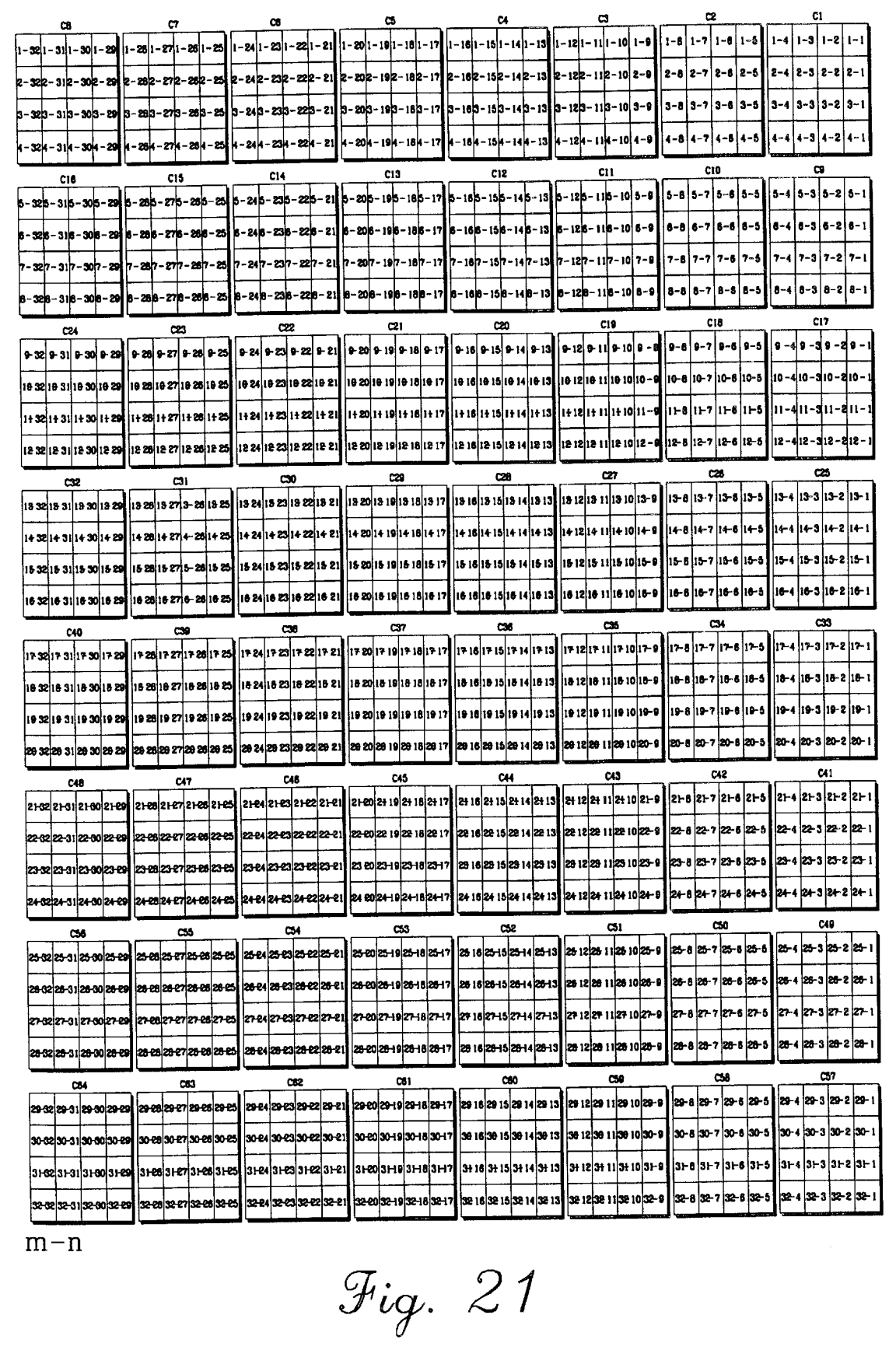

FIG. 21 is a view illustrating a pin-to-pin connection relationship between internal pins of each connector and unit switches from 1,024×1,024 back board connector in a three-dimensional structure. From the FIG. 21, "m" at the front-end switches means the pin number of unit switches, "n" means the pin number of unit switches; "n" at the rear-end switches means the pin number of unit switches, "m" means the pin number of unit switches.

Referring to the FIGS. 18 to 21, the switching device in three-dimensional structure according to this invention is discussed. As illustrated in the FIG. 18, the back board connector used for directly connecting PBAs at the front and rear end has a square structure with 16 pins for signal connection, as illustrated in FIG. 19. From the FIG. 19, 10A illustrates the structure of back board connector of this invention. By referring to the structure of back board connector as illustrated in the 19A, the structure is equipped with the actual interconnection connector of PBAs as shown in 19B and non-interconnection connection of PBAs as shown in 19C. As aforementioned, the reason why some of connected and non-connected connectors to PBAs are provided at back board connector is to remove the signal's interference which may occur from adjacent connectors, when PBAs are actually connected to the back board connector. The physical sizes (width×length, pin diameter, pin interval, etc.) of the back board connector may be determined depending upon the sizes of PCB and back board, when embodied. This invention describes 1,024×1,024 switch network as an example. FIG. 20 is a view illustrating an connector array of back board connector from 1,024×1,024 switch network in a three-dimensional structure according to this invention, and FIG. 12 a view illustrating a pin-to-pin relationship between internal pins and unit switches of each connector.

As described in the above, the large-scale switch network constructed in a three-dimensional structure using unit switches has the following advantages:

First, since the connection of circuit board (unit switch) is directly available by connectors on a back board, N pieces of electric signal line may be reduced on the back board of switch network. Further, in case of a three-dimensional structure, circuit boards are directly connected on a back board connector, the connection within several millimeters may be available. Thus, the length of connected link is short, and any damping in signal transfer may be prevented.

Secondly, since the connected length of circuit board is same and as seen in ATM switch, signal jitter, a serious problem in high speed signal transfer, does not occur.

Thirdly, since circuit boards are connected each other via back board, the insertion and abstraction of circuit are convenient.

As aforementioned, when ATM large-scale switch network is embodied in a three-dimensional structure using PBA and back board connector of this invention, it has also advantages: a) the availability of plural unit switches assembled to one PCB may enhance the performance efficiency of PCB and at the same time, reduce the volume of switch network hardware, and b) by using the back board connector, the connection and detachment at the front-end and rear-end switches is convenient with easy application to a three-dimensional structure switch network in optional size.

While there been illustrated and described what are considered to be preferred embodiments of the present invention, it will be understood by those skilled in the art that various change and modifications and equivalents may be substituted for elements thereof without departing from the true scope of the present invention. Therefore, it is intended that the present invention not be limited to the particular embodiments disclosed as the best mode contemplated for carrying out the present invention, but that the present invention includes all embodiments falling within the scope of the appended claims.

What is claimed is:

1. An asynchronous transfer mode switch apparatus switching asynchronous transfer mode data cells and constructed from Banyan networks, the apparatus comprising:

a first plurality of unit switches at a front part of the apparatus and partitioned as front end unit switches, said front end unit switches arranged horizontally, and said first plurality of unit switches switching asynchronous transfer mode data cells;

a second plurality of unit switches at a rear part of the apparatus and partitioned as rear end unit switches, said rear end unit switches arranged vertically, and said second plurality of unit switches switching asynchronous transfer mode data cells;

output ports located in said front end unit switches; and
input ports located in said rear end unit switches, said output ports of said front end unit switches connected to said input ports of said rear-end unit switches.

2. A switch apparatus switching asynchronous transfer mode data cells and constructed from Banyan networks, the apparatus comprising:

a plurality of front-end switches having output ports;

a first plurality of unit switches being placed at a front part of the apparatus, said first plurality of unit switches being partitioned by said front-end switches, and said first plurality of unit switches switching asynchronous transfer mode data cells;

a plurality of rear-end switches having input ports; and a second plurality of unit switches being placed at a rear part of the apparatus, said second plurality of unit switches being partitioned by said rear-end switches, and said second plurality of unit switches switching asynchronous transfer mode data cells, the output ports of said front-end switches being connected to the input ports of said rear-end switches.

3. The apparatus of claim 2, wherein said front-end switches are equally spaced apart and are arranged vertically, and said rear-end switches are equally spaced apart and are arranged horizontally.

4. The apparatus of claim 2, further comprising a backboard being disposed between said plurality of front-end switches and said plurality of rear-end switches, said backboard coupling said plurality of front-end switches with said plurality of rear-end switches.

5. The apparatus of claim 2, wherein the apparatus is implemented in a three-dimensional structure.

6. The apparatus of claim 2, wherein said first plurality of unit switches are interconnected.

7. The apparatus of claim 2, wherein said first plurality of unit switches are assembled to one circuit board.

8. The apparatus of claim 2, further comprising a backboard connector having a front end and a rear end, and having electrically conductive terminals.

9. The apparatus of claim 8, wherein circuit boards containing said first plurality of unit switches are mounted to the front end of said backboard connector and are arranged horizontally.

10. The apparatus of claim 8, wherein circuit boards containing said second plurality of unit switches are mounted to the rear end of said backboard connector and are arranged vertically.

11. The apparatus of claim 8, further comprising:

a plurality of front-end circuit boards having output links;

a plurality of rear-end circuit boards having input links, the output links at said front-end circuit boards and the input links at said rear-end circuit boards being connected to said electrically conductive terminals of said backboard connector.

12. The apparatus of claim 2, wherein the output ports of said front-end switches are connected to the input ports of said rear-end switches in an alternating manner wherein a first output port of a first front-end switch is connected to a first input port of a first rear-end switch, and a second output port of said first front-end switch is connected to a first input port of a new rear-end switch, said new rear-end switch being other than said first rear-end switch.

13. An asynchronous transfer mode switch apparatus in a three-dimensional structure constructed from Banyan networks, the apparatus comprising:

a backboard connector having a front end and a rear end, and having electrically conductive terminals;

a first plurality of circuit boards placed at the front end of said backboard connector, said first plurality of circuit boards being arranged horizontally;

a second plurality of circuit boards placed at the rear end of said backboard connector, said second plurality of circuit boards being arranged vertically;

output links connected to said backboard connector;

input links connected to said backboard connector; and a plurality of unit switches being interconnected so as to maintain characteristics of Banyan networks, said plurality of unit switches being assembled to one circuit board and switching asynchronous transfer mode data cells.

14. A method of fabricating an asynchronous transfer mode switch apparatus constructed from Banyan networks using unit switches, comprising the steps of:

placing a first plurality of unit switches at a front part of the apparatus, said first plurality of unit switches switching asynchronous transfer mode data cells;

partitioning said first plurality of unit switches by front-end switches;

placing a second plurality of unit switches at a rear part of the apparatus, said second plurality of unit switches switching asynchronous transfer mode data cells;

partitioning said second plurality of unit switches by rear-end switches;

horizontally arranging said front-end switches;

vertically arranging said rear-end switches; and connecting output ports of said front-end switches to input ports of said rear-end switches.

15. A three-dimensional switch apparatus switching asynchronous transfer mode data cells and being constructed from Banyan networks, the apparatus comprising:

a first plurality of boards being arranged horizontally, said first plurality of boards comprising:

a top board having a top face, a bottom face, a front edge, a rear edge, a left edge, and a right edge;

a bottom board having a top face, a bottom face, a front edge, a rear edge, a left edge, and a right edge; and a plurality of horizontal center boards disposed between said top board and said bottom board, each horizontal center board having a top face, a bottom face, a front edge, a rear edge, a left edge, and a right edge;

a second plurality of boards being arranged vertically, said second plurality of boards comprising:

a left board having a top edge, a bottom edge, a front edge, a rear edge, a left face, and a right face, said front edge of said left board being adjacent to said rear edges of said top board, said bottom board, and said plurality of horizontal center boards;

a right board having a top edge, a bottom edge, a front edge, a rear edge, a left face, and a right face, said front edge of said right board being adjacent to said rear edges of said top board, said bottom board, and said plurality of horizontal center boards; and a plurality of vertical center boards disposed between said left board and said right board, each vertical center board having a top edge, a bottom edge, a front edge, a rear edge, a left face, and a right face;

a first plurality of unit switches being coupled to said top board, switching asynchronous transfer mode data cells, and having a first plurality of input and output ports;

a first plurality of rear-edge switches being selected from among said first plurality of unit switches and being adjacent to said rear edge of said top board;

a second plurality of unit switches being coupled to said bottom board, switching asynchronous transfer mode data cells, and having a second plurality of input and output ports;

a second plurality of rear-edge switches being selected from among said second plurality of unit switches and being adjacent to said rear edge of said bottom board;

a third plurality of unit switches being coupled to said left board, switching asynchronous transfer mode data cells, and having a third plurality of input and output ports;

a first plurality of front-edge switches being selected from among said third plurality of unit switches and being adjacent to said front edge of said left board;

a fourth plurality of unit switches being coupled to said right board, switching asynchronous transfer mode data cells, and having a fourth plurality of input and output ports;

a second plurality of front-edge switches being selected from among said fourth plurality of unit switches and being adjacent to said front edge of said right board;

a first rear-edge switch of said first plurality of rear-edge switches being adjacent to said left edge of said top board;

a second rear-edge switch of said first plurality of rear-edge switches being adjacent to said right edge of said top board;

a first rear-edge switch of said second plurality of rear-edge switches being adjacent to said left edge of said bottom board;

a second rear-edge switch of said second plurality of rear-edge switches being adjacent to said right edge of said bottom board;

a first front-edge switch of said first plurality of front-edge switches being adjacent to said top edge of said left board, a first input port of said first front-edge switch of said first plurality of front-edge switches being coupled to and receiving asynchronous transfer mode data cells from a first output port of said first rear-edge switch of said first plurality of rear-edge switches, said first input port being selected from among said third plurality of input ports, and said first output port being selected from among said first plurality of output ports;

a second front-edge switch of said first plurality of front-edge switches being adjacent to said bottom edge of said left board, a second input port of said second front-edge switch of said first plurality of front-edge switches being coupled to and receiving asynchronous transfer mode data cells from a second output port of said first rear-edge switch of said second plurality of rear-edge switches, said second input port being selected from among said third plurality of input ports, and said second output port being selected from among said second plurality of output ports;

a first front-edge switch of said second plurality of front-edge switches being adjacent to said top edge of said right board, a third input port of said first front-edge switch of said second plurality of front-edge switches being coupled to and receiving asynchronous transfer mode data cells from a third output port of said second rear-edge switch of said first plurality of rear-edge switches, said third input port being selected from among said fourth plurality of input ports, and said third output port being selected from among said first plurality of output ports; and a second front-edge switch of said second plurality of front-edge switches being adjacent to said bottom edge of said right board, a fourth input port of said first front-edge switch of said second plurality of front-edge switches being coupled to and receiving asynchronous transfer mode data cells from a fourth output port of said second rear-edge switch of said second plurality of rear-edge switches, said fourth input port being selected from among said fourth plurality of input ports, and said fourth output port being selected from among said second plurality of output ports.

16. The apparatus of claim 15, further comprising a backboard disposed vertically between said first plurality of boards and said second plurality of boards, said backboard electrically coupling said rear-edge switches of said first plurality of boards with said front-edge switches of said second plurality of boards, and said backboard conveying asynchronous transfer mode data cells from said rear-edge switches of said first plurality of boards to said front-edge switches of said second plurality of boards.

17. The apparatus of claim 16, said coupling of said rear-edge switches of said first plurality of boards with said front-edge switches of said second plurality of boards corresponding to a direct coupling, wherein every respective output port of said first rear-edge switch of said first plurality of rear-edge switches is coupled to a respective input port of said first front-edge switch of said first plurality of front-edge switches.

18. The apparatus of claim 16, said coupling of said rear-edge switches of said first plurality of boards with said front-edge switches of said second plurality of boards corresponding to a indirect coupling, wherein not every respective output port of said first rear-edge switch of said first plurality of rear-edge switches is coupled to a respective input port of said first front-edge switch of said first plurality of front-edge switches.

19. The apparatus of claim 18, wherein said indirect coupling of said rear-edge switches of said first plurality of boards with said front-edge switches of said second plurality of boards corresponds to a shuffled coupling, wherein a first output port of said first rear-edge switch of said first plurality of rear-edge switches is coupled to a first input port of said first front-edge switch of said plurality of front-edge switches, a second output port of said first rear-edge switch of said first plurality of rear-edge switches is not coupled to a second input port of said first front-edge switch of said plurality of front-edge switches, and said second output port of said first rear-edge switch of said first plurality of rear-edge switches is coupled to an input port of a front-edge switch of said plurality of front-edge switches other than said first front-edge switch of said plurality of front-edge switches.

* * * * *